United States Patent [19]

Fujimoto

[11] Patent Number: 5,119,208
[45] Date of Patent: Jun. 2, 1992

[54] IMAGE SIGNAL RECORDING APPARATUS
[75] Inventor: Ryo Fujimoto, Kanagawa, Japan
[73] Assignee: Canon Kabushiki Kaisha, Tokyo, Japan
[21] Appl. No.: 728,792
[22] Filed: Jul. 8, 1991

Related U.S. Application Data

[63] Continuation of Ser. No. 345,411, Apr. 28, 1989, abandoned.

[30] Foreign Application Priority Data

May 6, 1988 [JP] Japan .................................. 63-111335

[51] Int. Cl.$^5$ .......................... H04N 9/79; H04N 5/25
[52] U.S. Cl. .................................... 358/310; 358/909; 358/335; 358/906
[58] Field of Search ............... 358/335, 906, 310, 330, 358/138, 909, 336, 342

[56] References Cited

U.S. PATENT DOCUMENTS

| 4,719,518 | 1/1988 | Kido et al. | 358/330 |
| 4,918,538 | 4/1990 | Saito et al. | 358/335 |
| 5,032,930 | 7/1991 | Suetaka et al. | 358/342 |

OTHER PUBLICATIONS

Aizawa et al., High Resolution Electronic Still Camera with Two MOS Imagers, May 10, 1985.

Primary Examiner—Roy N. Envall, Jr.
Assistant Examiner—Robert Chevalier
Attorney, Agent, or Firm—Robin, Blecker, Daley & Driscoll

[57] ABSTRACT

An image signal recording apparatus of this invention is an apparatus for recording an image signal on a recording medium. This apparatus is arranged to form a recording image signal to be recorded on the recording medium by employing a first image signal having a first frequency band and a third image signal which is obtained by sampling a second image signal having a second frequency band and which has a third frequency band narrower than the first frequency band and the second frequency band, and then to record the thus-formed recording image signal on the recording medium. With this arrangement, it is possible to record on the recording medium a wide-band image signal without any deterioration.

21 Claims, 8 Drawing Sheets

FIG.2

| R | B | R | B | R | B | R | B |
|---|---|---|---|---|---|---|---|
| R | B | R | B | R | B | R | B |
| B | R | B | R | B | R | B | R |
| B | R | B | R | B | R | B | R |
| R | B | R | B | R | B | R | B |
| R | B | R | B | R | B | R | B |

FIG.7

| G | R | G | B | G | R | G | B | G |
|---|---|---|---|---|---|---|---|---|
| R | G | B | G | R | G | B | G | R |
| G | B | G | R | G | B | G | R | G |
| B | G | R | G | B | G | R | G | B |
| G | R | G | B | G | R | G | B | G |
| R | G | B | G | R | G | B | G | R |
| G | B | G | R | G | B | G | R | G |

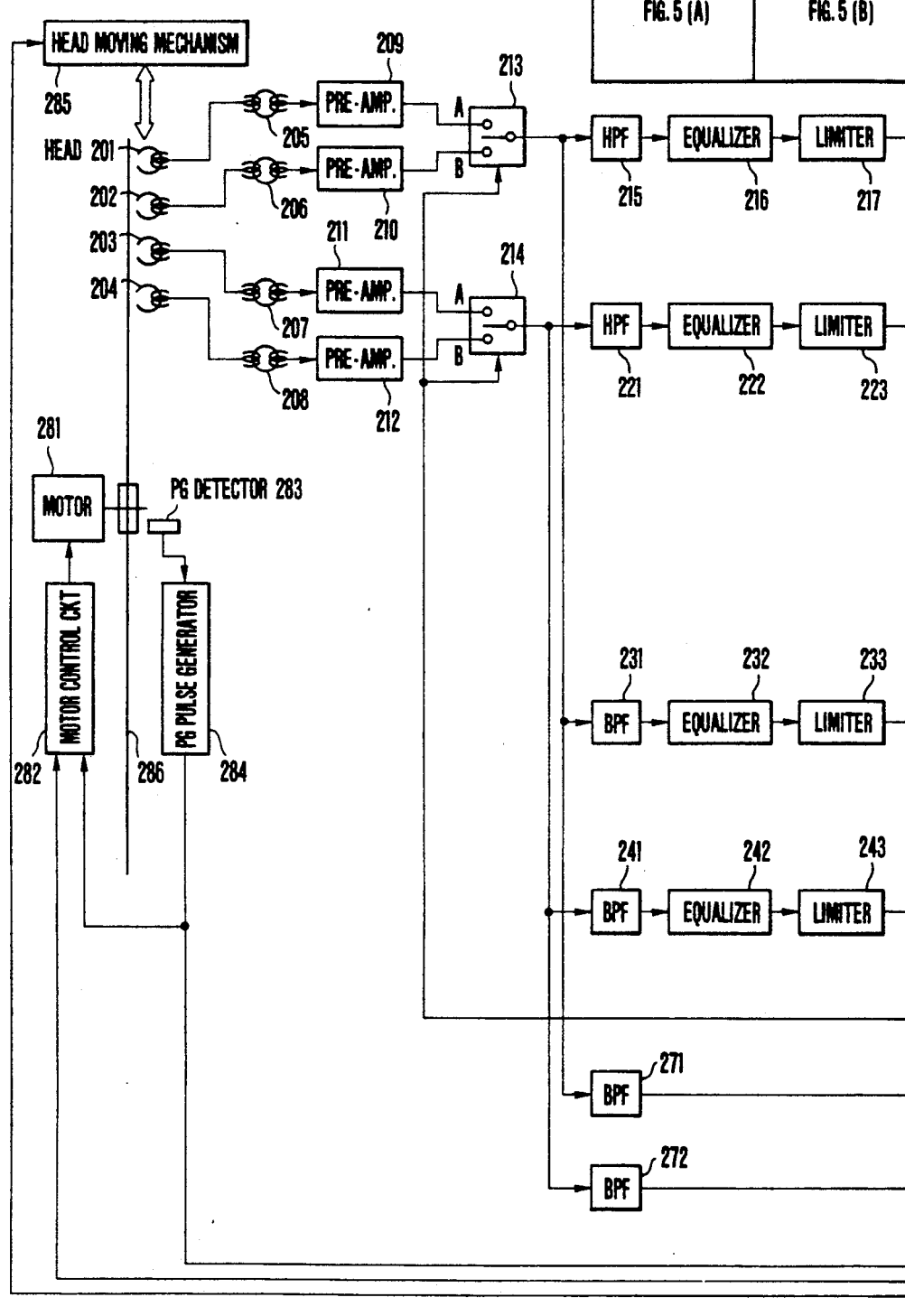

IMAGE SIGNAL RECORDING APPARATUS

This is a continuation of application under 37 CSR 1.62 of prior application Ser. No. 345,411, filed Apr. 28, 1989, now abandoned.

BACKGROUND OF THE INVENTION

1. Field of the Invention

The present invention relates to an image signal recording apparatus for recording an image signal on a recording medium.

2. Description of the Related Art

Electronic still video cameras have heretofore been known as recording/reproducing apparatus for recording a video signal obtained through image sensing means such as a video camera on a recording medium such as a magnetic disc and for reproducing the video signal recorded on the recording medium.

Currently known types of electronic still video cameras, however, can only record or reproduce a television signal which, at best, conforms to current television systems (for example, the NTSC system). Accordingly, in the case of a format which complies with the NTSC system, the number of scanning lines is 525 lines per frame with a horizontal resolution of 350 TV lines.

In such a situation, with the present improvement in the quality of images handled by video tape recorders, it has been strongly desired to improve the quality of images processed by electonic still video cameras.

However, the degree of resolution adopted by the current electronic still video cameras is not sufficient to effect recording and reproduction of still images of satisfactory quality. Moreover, even if a video signal reproduced from a magnetic disc is printed in the form of a still image, the resultant image is an image whose quality is far lower than the quality of an image obtained by a conventional camera such as a silver-halide type camera.

A novel television system of increased quality such as a high-definition television system has recently been proposed, and various experiments on such a novel television system have been conducted. When electronic still video cameras which comply with the new television system are to be designed, designers will encounter the problem that it is very difficult to realize satisfactory recording and reproduction using the current format. Moreover, if a new format is adopted in accordance with the new television system, it will be difficult to maintain compatibility with the conventional format.

Moreover, since the band of a chrominance signal is narrower than the band of a luminance signal, the aliasing of a signal tends to easily occur in the band of the chrominance signal, particularly when imaging is effected by means of a solid-state image sensor. The result is that the quality of an image is deteriorated due to the occurrence of the aliasing.

SUMMARY OF THE INVENTION

It is, therefore, an object of the present invention to provide an image signal recording apparatus capable of overcoming the above-described problems.

It is another object of the present invention to provide an image signal recording apparatus having compatibility with a conventional format and yet being capable of recording on a recording medium an image signal which has higher quality and a wider band than an image signal recorded by a conventional apparatus.

To achieve the above objects, in accordance with one aspect of the present invention, there is provided an image signal recording apparatus for recording an image signal on a recording medium. This apparatus is provided with first image signal outputting means for outputting a first image signal having a first frequency band; second image signal outputting means for outputting a second image signal having a second frequency band and a signal component which differs from a signal component of the first image signal; third image signal outputting means for sampling the second image signal output from the second image signal outputting means to form a third image signal having a third frequency band which is narrower than the first and second frequency bands and to output the third image signal; recording image signal forming means for forming a recording image signal to be recorded on the recording medium by using the first image signal output from the first image signal outputting means and the third image signal output from the third image signal forming means; and recording means for recording on the recording medium the recording image signal formed by the recording image signal forming means.

It is still another object of the present invention to provide an image signal recording apparatus capable of recording on a recording medium an image signal obtained by imaging an object, with improved quality and a widened band but without substantial aliasing noise.

To achieve the above object, in accordance with another aspect of the present invention, there is provided an image signal recording apparatus for recording on an recording medium an image obtained by imaging an object. This apparatus is provided with first image sensing means for imaging the object to generate a first image signal having a first frequency band; second image sensing means for imaging the object to generate a second image signal having a frequency band equal to the first frequency band of the first image signal and having a signal component which is the same in kind as a signal component of the first image signal, the arrangement of picture elements of the second image sensing means differing from the arrangement of picture elements of the first image sensing means in relation to the object; third image sensing means for imaging the object to generate a third image signal having a second frequency band and a signal component which differs in kind from a signal component of one of the first image signal and the second image signal; fourth image signal forming means for sampling the third image signal generated by the third image sensing means to form a fourth image signal having a third frequency band which is narrower than the first and second frequency bands; recording image signal forming means for forming a first recording image signal for one frame by using the first image signal output from the first image sensing means and the fourth image signal output from the fourth image signal forming means and for forming a second recording image signal for one frame by using the second image signal output from said second image sensing means and the fourth image signal output from the fourth image signal forming means; and recording means for recording the first recording image signal for one frame and the second recording image signal for one frame which have been formed by the recording image signal forming means, in different regions on the recording medium, respectively.

The above and other objects, features and advantages of the present invention will become apparent from the following detailed description of embodiments of the present invention, taken in conjunction with the accompanying drawings.

BRIEF DESCRIPTION OF THE DRAWINGS

FIG. 2 is a diagrammatic view showing the construction of a color filter provided on the imaging plane of a solid-state image sensor used in the recording part of the electronic still video camera shown in FIGS. 1, 1(A) and 1(B);

FIGS. 5, 5(A) and 5(B) are block diagrams showing the construction of the reproducing part of the electronic still video camera to which the above embodiment of the present invention is applied;

FIG. 7 is a diagrammatic view which serves to illustrate another embodiment of the present invention, and shows the construction of a color filter for use in an electronic still video camera for effecting recording and reproduction of a high-fineness video signal by means of a single solid-state image sensor.

DETAILED DESCRIPTION OF THE PREFERRED EMBODIMENTS:

Preferred embodiments of the present invention will be described below with reference to the accompanying drawings.

Figure 1A:
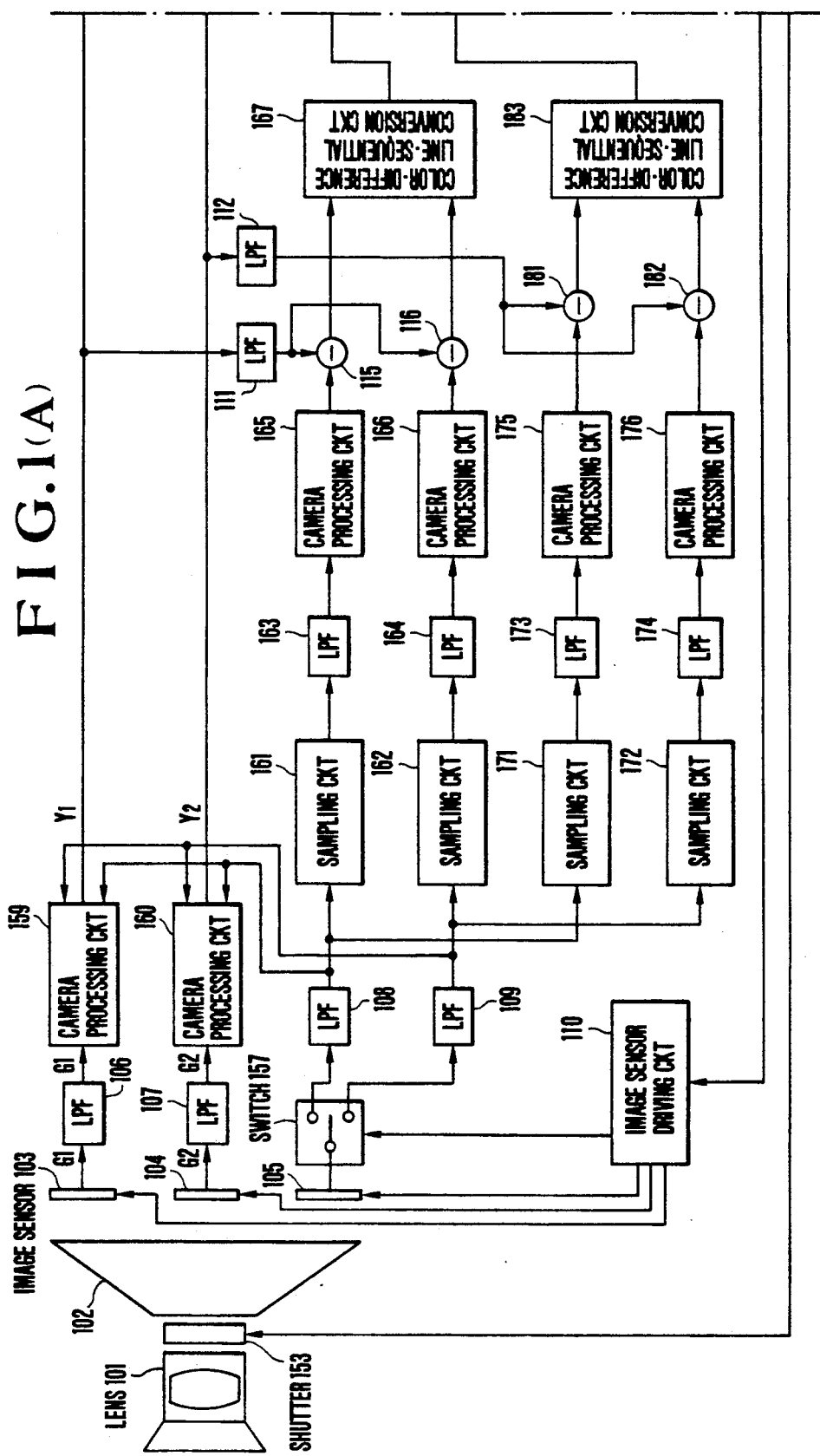
FIGS. 1, 1(A) and 1(B) are block diagrams showing the construction of the recording part of an electronic still video camera to which one embodiment of the present invention is applied.
Figure 1:
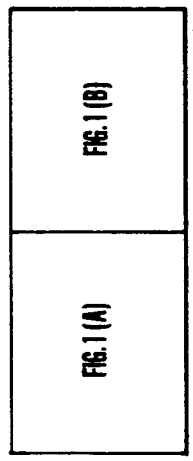
Figure 1B:
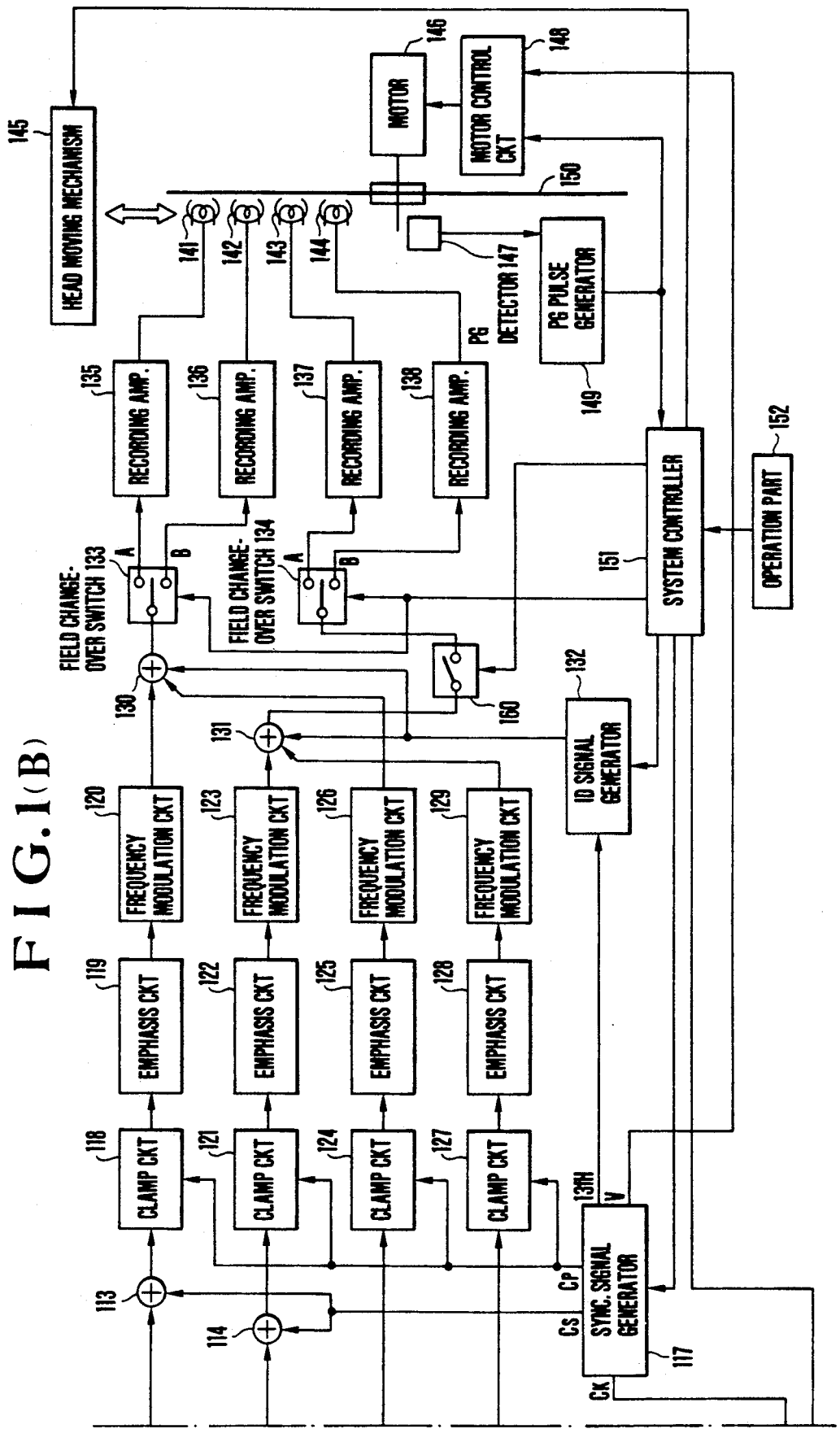

FIGS. 1, 1(A) and 1(B) are block diagrams which diagrammatically show the construction of the recording part of an electronic still video camera system to which one embodiment of the present invention is applied.

The following is a description of the recording operation of the recording part of the electronic still video camera system shown in FIGS. 1, 1(A) and 1(B).

Referring to FIGS. 1, 1(A) and 1(B), when a system controller 151 receives an instruction to initiate a recording operation from an operation part 152, incident light representing an image of an object (not shown) is fed into a prism 102 through an optical lens 101 and a shutter 153 whose operation is controlled by the system controller 151. The prism 102 splits the incident light into three pencils of light corresponding to the respective imaging planes of three solid-state image sensors 103, 104, and 105, and the three pencils of light rays are fed to the corresponding imaging planes to form images of the same object on the imaging planes of the respective solid-state image sensors 103, 104, and 105.

As compared with the position of the imaging plane of the solid-state image sensor 103, the position of the imaging plane of the solid-state image sensor 104 is shifted by a half picture element in each of the horizontal and vertical directions with respect to the image obtained by imaging the object. The imaging plane of the solid-state image sensor 105 and the imaging plane of the solid-state image sensor 103 are positioned at the same location with respect to the image obtained by imaging the object.

A green filter (not shown) is provided on the imaging plane of each of the solid-state image sensors 103 and 104. When the system controller 151 receives an instruction to initiate a recording operation from the operation part 152, the system controller 151 transmits to a synchronizing signal generator 117 an instruction to initiate the recording operation. The synchronizing signal generator 117 in turn supplies a clock signal Ck to an image sensor driving circuit 110. In synchronization with the received clock signal Ck, the image sensor driving circuit 110 drives the solid-state image sensors 103, 104, and 105 and controls the switching operation of a switch 157.

The solid-state image sensor 103 driven by the image sensor driving circuit 110 outputs a green-component video signal (hereinafter referred to as the "$G_1$ signal"). This $G_1$ signal is band-limited by a low-pass filter (LPF) 106 and then supplied to a camera processing circuit 159, where it is subjected to a predetermined processing such as gamma correction. Then, the camera processing circuit 159 adds, in an appropriate ratio, the $G_1$ signal to a red-component video signal (hereinafter referred to as the "R signal") and a blue-component video signal (hereinafter referred to as the "B signal"), both of which are provided by the solid-state image sensor 105 in a manner which will be described later. Thus, the camera processing circuit 159 forms and outputs a luminance signal $Y_1$. The solid-state image sensor 104 outputs a green-component video signal (hereinafter referred to as the "$G_2$ signal"). In a manner similar to that used in forming the $G_1$ signal output from the solid-state image sensor 103, the $G_2$ signal is output as a luminance signal $Y_2$ through a low-pass filter (LPF) 107 and a camera processing circuit 160.

As described above, the luminance signal $Y_1$ and the luminance signal $Y_2$ formed by the respective camera processing circuits 159 and 160 are applied to corresponding addition circuits 113 and 114. In the addition circuit 113, the luminance signal $Y_1$ is multiplexed with a composite synchronizing signal Cs which is composed of horizontal and vertical synchronizing signals and which is generated by the synchronizing signal generator 117, while in the addition circuit 114, the luminance signal $Y_2$ is multiplexed with such a composite synchronizing signal Cs. Thereafter, the signals output from the respective addition circuits 113 and 114 are subjected to known clamping in corresponding clamp circuits 118 and 121 in synchronization with a clamp pulse Cp output from the synchronizing signal generator 117. After the composite synchronizing signals Cs have been added as described above and the clamping has been effected, the luminance signal $Y_1$ is converted into a frequency-modulated luminance signal which conforms to a known format of electronic still video cameras through an emphasis circuit 119 and a frequency modulation circuit 120, while the luminance signal $Y_2$ is converted into a frequency-modulated luminance signal which conforms to the known format through an emphasis circuit 122 and a frequency modulation circuit 123. These frequency-modulated signals are supplied to corresponding adders 130 and 131.

The imaging plane of the solid-state image sensor 105 is provided with an R.B color filter having the construction shown in FIG. 2. R signals and B signals are sequentially output in the order determined by the R.B color filter from the solid-state image sensor 105 driven by the image sensor driving circuit 110. The R and B signals are in turn supplied to the switch 157 whose switching operation is controlled by the image sensor driving circuit 110. The R and B signals are then selectively applied to, and output from, the output terminal A or B of the switch 157.

The R.B color filter shown in FIG. 2 is disposed in such a manner that the meshes thereof correspond to the picture elements of the solid-state image sensor 105, and red filter elements (represented by R in FIG. 2) and blue filter elements (represented by B in FIG. 2) are arranged in the illustrated manner.

The R signal which has been output from the switch 157 is band-limited by a low-pass filter (LPF) 108, and is then supplied to the camera processing circuits 159 and 160 for the purpose of forming the luminance signals $Y_1$ and $Y_2$ as described above, respectively.

In the meantime, the output of the low-pass filter (LPF) 108 is supplied to a sampling circuit 161, where it is sampled at a sampling frequency lower than the sampling rate at which sampling is effected in the solid-state image sensor 105. The sampled signal output from the sampling circuit 161 is band-limited by a low-pass filter (LPF) 163, then subjected to a predetermined processing such as gamma correction in a camera processing circuit 165, and subsequently supplied to a subtracter 115. (The R signal processed as described above is hereinafter referred to as the "$R_1$ signal".)

In the meantime, the luminance signal $Y_1$ output from the camera processing circuit 159 is applied to a low-pass filter (LPF) 111, where it is band-limited and converted into a luminance signal $Y_{1L}$. The luminance signal $Y_{1L}$ thus band-limited is supplied to the subtracter 115. The subtracter 115 subtracts the luminance signal $Y_{1L}$ from the $R_1$ signal to form a color-difference signal $R_1 - Y_{1L}$, and then supplies the color-difference signal $R_1 - Y_{1L}$ to a color-difference line-sequential conversion circuit 167 disposed in the following stage.

The output of the low-pass filter (LPF) 108 is also supplied to a sampling circuit 171, and is likewise processed through the sampling circuit 171, a low-pass filter (LPF) 173, and a camera processing circuit 157. The thus-obtained R signal (hereinafter referred to as the "$R_2$ signal") is supplied to a subtracter 181. In the meantime, the luminance signal $Y_2$ output from the camera processing circuit 160 is applied to a low-pass filter (LPF) 112, where it is band-limited and converted into a luminance signal $Y_{2L}$. The luminance signal $Y_{2L}$ thus band-limited is supplied to the subtracter 181. The subtracter 181 subtracts the luminance signal $Y_{2L}$ from the $R_2$ signal to form a color-difference signal $R_2 - Y_{2L}$, and then supplies the color-difference signal $R_2 - Y_{2L}$ to a color difference line-sequential conversion circuit 183 disposed in the following stage.

The sampling timings of the respective sampling circuits 161 and 171 are set so that their sample outputs are 180° out of phase with each other.

Also, the output of the low-pass filter (LPF) 109 is supplied to the camera processing circuits 159 and 160 and sampling circuits 162 and 172, and that output is subjected to processings similar to those applied to the R signal. Thus, a color-difference signal $B_1 - Y_{1L}$ and a color-difference signal $B_2 - Y_{2L}$ are output from subtracters 116 and 182 to the color-difference line-sequential conversion circuits 167 and 183, respectively.

As in the case of the sampling circuits 161 and 171, the sampling timings of the respective sampling circuits 162 and 172 are set so that their sample outputs are 180° out of phase with each other.

The color-difference line-sequential conversion circuit 167 employs the supplied color-difference signals $R_1 - Y_{1L}$ and $B_1 - Y_{1L}$ to form a color-difference line-sequential signal $C_1$ which serves as the format of a chrominance signal for electronic still video cameras. The color-difference line-sequential conversion circuit 183 likewise employs the supplied color-difference signals $R_2 - Y_{2L}$ and $B_2 - Y_{2L}$ to form a color-difference line-sequential signal $C_2$. The color-difference line-sequential signals $C_1$ and $C_2$ are supplied to clamp circuits 124 and 127, respectively.

The color-difference line-sequential signal $C_1$ corresponds to the luminance signal $Y_1$ formed on the basis of the $G_1$ signal output from the solid-state image sensor 103, while the color-difference line-sequential signal $C_2$ corresponds to the luminance signal $Y_2$ formed on the basis of the $G_2$ signal output from the solid-state image sensor 104. The color-difference line-sequential signals $C_1$ and $C_2$ are output such that their time axes are offset from each other by the period equivalent to the amount of discrepancy in position between the picture elements of the solid-state image sensor 103 and the corresponding picture elements of the solid-state image sensor 104.

The color-difference line-sequential signals $C_1$ and $C_2$ output from the color-difference line-sequential conversion circuit 167 are subjected to known clamping in the corresponding clamp circuits 124 and 127 in accordance with the clamp pulse Cp output from the synchronizing signal generator 117. The output of the clamp circuit 124 is converted into a frequency-modulated color-difference line-sequential signal which conforms to the known format of electronic still video cameras by an emphasis circuit 125 and a frequency modulation circuit 126, while the output of the clamp circuit 127 is converted into a frequency-modulated color-difference line-sequential signal which conforms to such a known format by an emphasis circuit 128 and a frequency modulation circuit 129. These frequency-modulated color-difference line-sequential signals are supplied to the corresponding adders 130 and 131.

An index signal (hereinafter referred to as the "ID signal") corresponding to the information which has been set in the system controller 151 through the operation part 152 prior to the recording operation, for example, a recording date or recording time is generated by an ID signal generator 132 during at least one intermediate period of the time interval equivalent to the vertical blanking period of a video signal in synchronization with a signal $13f_H$ which is synchronized with a horizontal synchronizing signal (hereinafter referred to as the "H signal") supplied from the synchronizing signal generator 117 and which has a frequency thirteen times the frequency of the H signal. The ID signal thus generated is supplied to the adders 130 and 131.

As described above, the frequency-modulated luminance signal $Y_1$, the frequency-modulated color-difference line-sequential signal $C_1$ and the ID signal are supplied to the adder 130. The adder 130 frequency-multiplexes the received signals of the three kinds to output a recording video signal for one frame which conforms to the known format of electronic still video cameras, and then supplies this one-frame recording video signal to a field change-over switch 133. In the meantime, the frequency-modulated luminance signal $Y_2$, the frequency-modulated color-difference line-sequential signal $C_2$, and the ID signal are supplied to the adder 131. The adder 131 frequency-multiplexes the received signals of the three kinds to output a recording video signal for one frame which conforms to the known format of electronic still video cameras, and then supplies this one-frame recording video signal to a field change-over switch 134 through a mode change-over switch 160.

A magnetic disc 150 is rotated by the driving of a motor 146 before the system controller 151 receives the instruction to initiate the recording operation from the operation part 152. The motor 146 is controlled by a motor control circuit 148 so that the motor 146 can rotate in a predetermined phase with respect to a vertical synchronizing signal V output from the synchronizing signal generator 117. More specifically, a PG detector 147 is arranged to detect the position of a PG pin (not shown) provided on the magnetic disc 150, and each time the PG detector 147 detects the passage of the PG pin, a PG pulse generator 149 generates a PG detection pulse. The PG detection pulse thus generated and the vertical synchronizing signal V generated by the synchronizing signal generator 117 are supplied to the motor control circuit 148, thereby controlling the motor 146 so that the PG detection pulse and the vertical synchronizing signal V bear a predetermined phase relationship. Thus, the magnetic disc 150 is rotated in synchronization with the vertical synchronizing signal V.

The PG detection pulse output from the PG pulse generator 149 is also supplied to the system controller 151. In synchronization with the PG detection pulse, the system controller 151 switches each of the field change-over switches 133 and 134 between opposite sides represented by A and B in FIG. 1(B) so that the recording video signal output from the adder 130 is switched at intervals of one field and alternately supplied to recording amplifiers 135 and 136, while the recording video signal output from the adder 131 is switched at intervals of one field and alternately supplied to recording amplifiers 137 and 138. The recording signals amplified by the respective recording amplifiers 135, 136, 137 and 138 are supplied to corresponding magnetic heads 141, 142, 143 and 144 which are aligned over the magnetic disc 150 in the radial direction thereof. Thus, the recording signals are recorded on the magnetic disc 150. The magnetic heads 141 to 144 are capable of moving over the magnetic disc 150 in the radial direction thereof by the driving of a head moving mechanism 145. By operating the operation part 152, a movement instruction signal is supplied from the system controller 151 to the head moving mechanism 145, thereby causing the magnetic heads 141 to 144 to move to arbitrary positions on the magnetic disc 150, respectively.

The mode change-over switch 160 is arranged to be switched on and off through the system controller 151 in response to an instruction supplied from the operation part 152. In the recording apparatus according to the above embodiment, the mode change-over switch 160 is provided with two kinds of recording mode: one is a normal recording mode in which a video signal for one frame obtained through the solid-state image sensors 103 and 105 is recorded on the magnetic disc 150 by means of the magnetic heads 141 and 142 and the other is a high-fineness recording mode in which a video signal for one frame obtained through the solid-state image sensors 103, 104 and 105 is recorded on the magnetic disc 150 by means of the magnetic heads 141, 142, 143, and 144. Which of two such recording modes should be selected to effect recording of video signals is determined by operating the operation part 152. More specifically, if the high-fineness recording mode is selected through the operation part 152, the system controller 151 switches on the mode change-over switch 160 to supply the recording video signal output from the adder 131 to the field change-over switch 134, thereby effecting recording on four concentric recording tracks which are contiguously formed on the magnetic disc 150. On the other hand, if the normal recording mode is selected, the system controller 151 switches off the mode change-over switch 160 to cut off the supply of the recording video signal output from the adder 131 to the field change-over switch 134, thereby effecting recording on two concentric recording tracks which are contiguously formed on the magnetic disc 150.

Figure 3A:
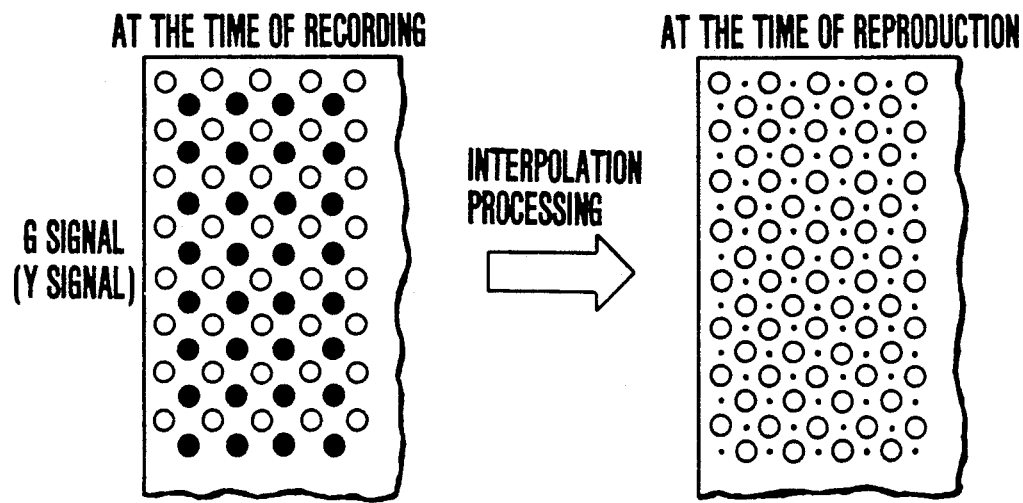
FIGS. 3(A), 3(B) and 3(C) are diagrammatic views each of which serves to illustrate the relationship between the arrangement of picture elements which correspond to a video signal recorded on a magnetic disc in a high-fineness recording mode in the electronic still video camera system according to the embodiment and the arrangement of picture elements which are interpolated during reproduction.
Figure 3B:
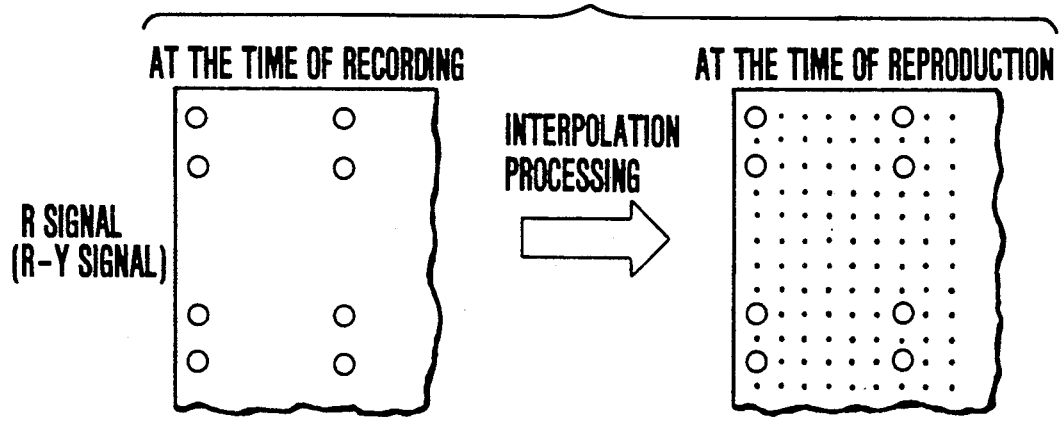
Figure 3C:
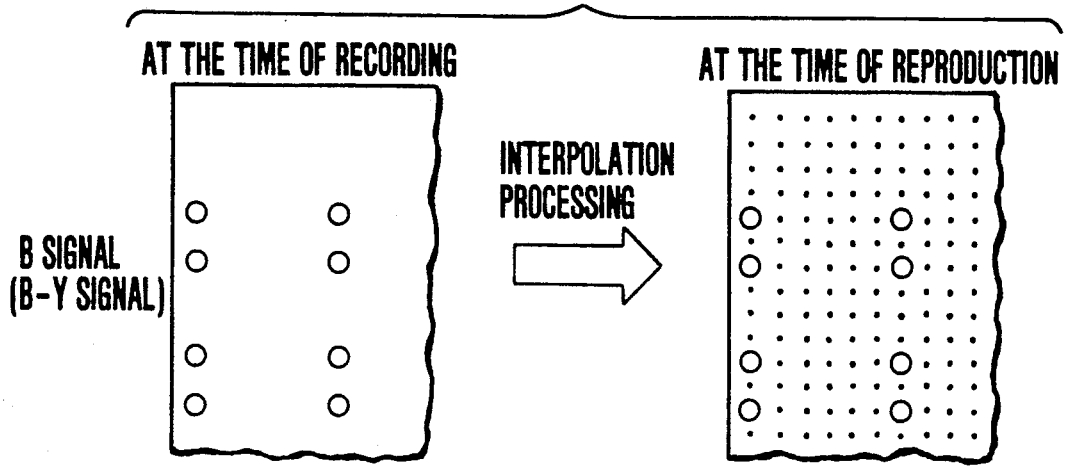

FIGS. 3(A), 3(B) and 3(C) show the relationships between the arrangement of picture elements which correspond to a video signal recorded on the magnetic disc 150 in the high-fineness recording mode in the above embodiment of the electronic still video camera system and the arrangement of picture elements which are interpolated during reproduction. FIG. 3(A) shows G signals (or luminance signals $Y_1$ and $Y_2$), where the $G_1$ and $G_2$ signals are represented by "◯" and "●", respectively). FIG. 3(B) shows R signals (or color-difference signals R-Y), and FIG. 3(C) shows B signals (or color-difference signals B-Y). The picture elements at the positions indicated by the marks "◯" in the right-hand view of each of FIGS. 3(A), 3(B) and 3(C) represent picture elements recorded on the magnetic disc, while the picture elements at the positions indicated by the marks "." in the left-hand view of each of FIGS. 3(A), 3(B) and 3(C) represent picture elements obtained by an interpolation processing.

As shown in FIGS. 3(A), 3(B) and 3(C), in a video signal recorded on the magnetic disc, the number of picture elements corresponding to the color-difference signals R-Y and B-Y is small compared to the number of picture elements corresponding to the luminance signal Y. This is because, according to the format of electronic still video cameras, the band allocated for the chrominance signal is narrow compared to the band of the luminance signal and the chrominance signal does not require as high resolution as the luminance signal.

In the above embodiment, the color-difference signals R-Y and B-Y which have the arrangements of picture elements shown in FIGS. 3(B) and 3(C), respectively, are formed by the above-described method. However, if a video signal output from the solid-state image sensor 105 having the R.B color filter shown in FIG. 2 is, immediately after an imaging step, sampled to provide corresponding picture elements so that the signal provided by the solid-state image sensor 105 can be accommodated in the band of a chrominance signal according to the electronic still video format, then the aliasing of the signal will take place to cause a deterioration in the chrominance signal recorded on the magnetic disc.

For this reason, in the above embodiment, the R signal and the B signal provided by the solid-state image sensor 105 are respectively sampled at sampling frequencies which are higher than the sampling frequencies adopted in the subsequent sampling processes, and are then band-limited by the corresponding wide-band low-pass filters (LPF) 108 and 109. Then, the band-limited signals of the wide-band low-pass filters (LPF's) 108 and 109 are sampled by the sampling circuits 161; 171 and 162; 172, respectively, so as to match the band of the chrominance signal according to the electronic still video format. The outputs of the sampling circuits 161, 162, 171, and 172 are further band-limited by the narrow-band low-pass filters (LPF's) 163, 164, 173, and 174, respectively.

Figure 4A:
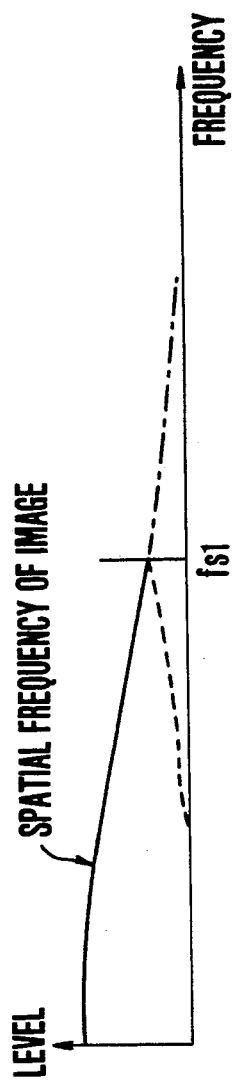
FIGS. 4(A), 4(B) and 4(C) are graphic representations showing the frequency spectra in the respective processing steps executed by the recording part shown in FIGS. 1, 1(A) and 1(B)
Figure 4B:
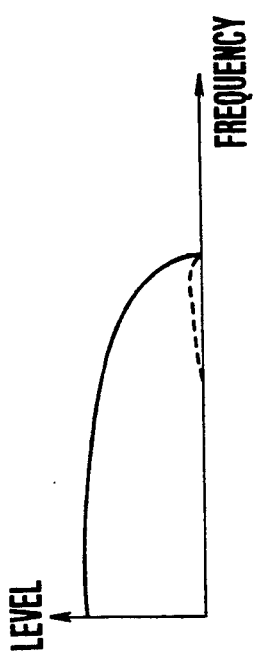
Figure 4C:
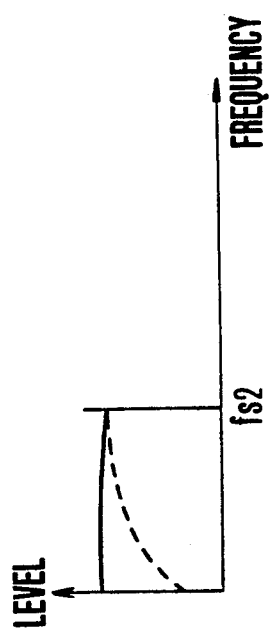

FIGS. 4(A), 4(B), and 4(C) are graphic representations showing the frequency spectra appearing in the respective processing steps of the above-described process.

FIG. 4(A) shows the frequency spectrum of an image signal (shown by a solid line) output from the solid-state image sensor 105. An image signal which extends into the band shown by a one-dot chain line of FIG. 4(A) is sampled at the frequency $f_{S1}$ shown in FIG. 4(A) by the use of the solid-state image sensor 105 having picture elements which are the same in number as those of each of the solid-state image sensors 103 and 104.

FIG. 4(B) shows the frequency spectrum of an image signal (shown by a solid line) band-limited by the low-pass filter (LPF) 108 or 109. As illustrated, in this processing step, the aliasing (shown by a dashed line) of the signal has not yet been eliminated.

FIG. 4(C) shows the frequency spectrum of an image signal (shown by a solid line) which has been output from the low-pass filter (LPF) 108 (or 109), then sampled by the sampling circuits 161 and 171 (or 162 and 172), and subsequently band-limited by the low-pass filters 163 and 173 (or 164 and 174). As illustrated, the signal aliasing appearing in the frequency spectrum of FIG. 4(A) or 4(B) is eliminated. It is to be noted that the aliasing of the signal (shown by a dashed line) appearing in the frequency spectrum of FIG. 4(C) is generated by effecting offset sampling using the solid-state image sensors 103 and 104, and it is not necessary to eliminate such aliasing since this aliasing is the information required to restore the chrominance signal to a signal of frequency band as high as $2f_{S2}$ by an interpolation processing during reproduction.

In order that a fluctuation which occurs in the time axis of a video signal during reproduction thereof may be eliminated in a reproducing part which will be described later, the recording part of the electronic still video camera according to the above embodiment is arranged to record, on the magnetic disc 150, both a recording video signal and the signal $13f_H$ which is supplied from the synchronizing signal generator 117 to the ID signal generator 132, the signal $13f_H$ serving as a reference signal for elimination of the fluctuation in the time axis. More specifically, the ID signal generator 132 generates the ID signal such as a recording date or recording time, which corresponds to the information which has been set in the system controller 151 through the operation part 152 prior to the recording operation, during at least one intermediate period of the time interval equivalent to the vertical blanking period of a video signal in synchronization with the signal $13f_H$ supplied from the synchronizing signal generator 117. During the rest of that time interval, the ID signal generator 132 outputs the ID signal supplied from the synchronizing signal generator 117.

Figure 5B:
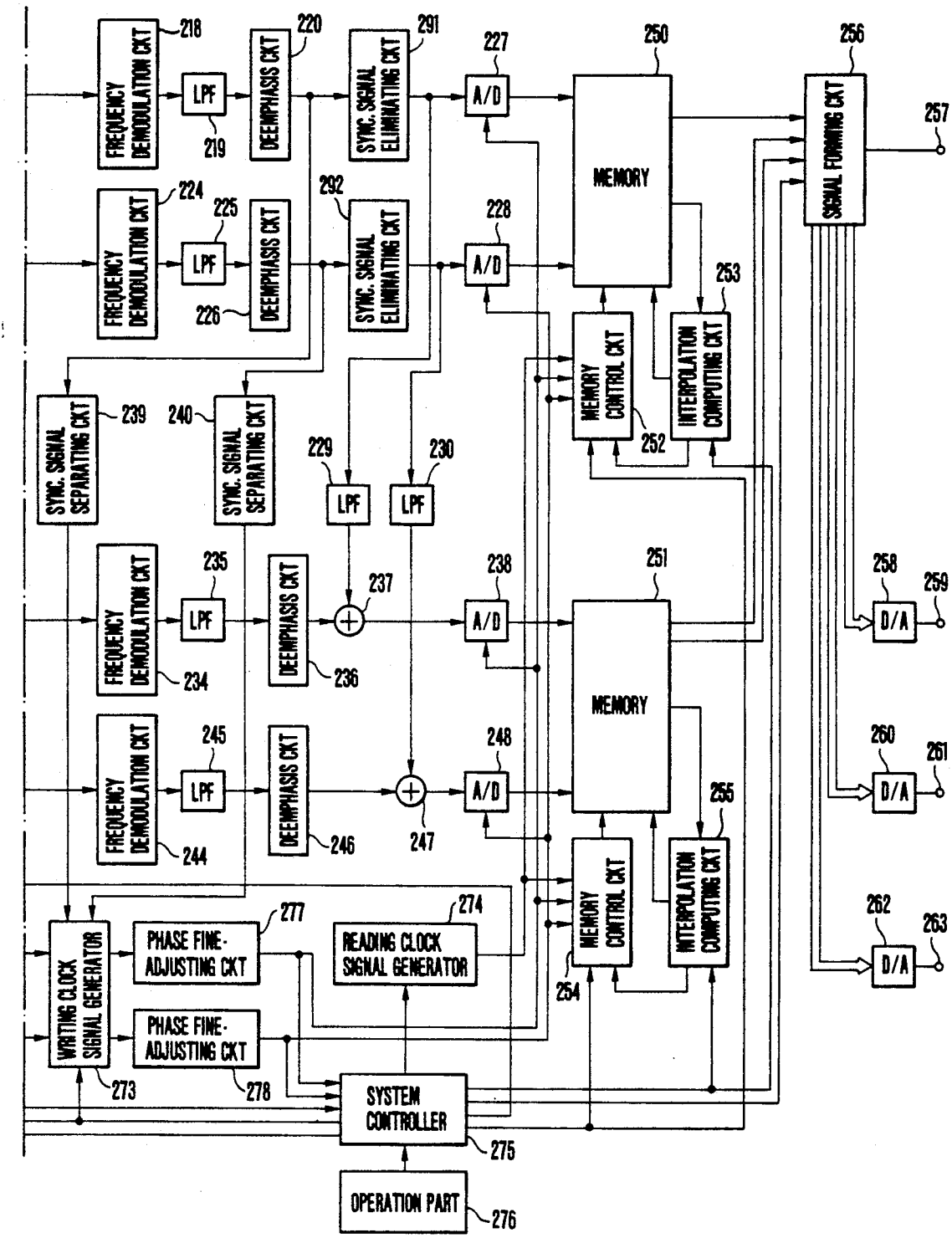

FIGS. 5, 5(A) and 5(B) are block diagrams which diagrammatically show the construction of the reproducing part of the electronic still video camera system according to the particular embodiment.

The following is a description of the reproducing operation of the reproducing part of the electronic still video camera system shown in FIGS. 5, 5(A) and 5(B). The reproducing part of the electronic still video camera system according to the above embodiment is arranged so that it can reproduce both a video signal which was recorded in the normal recording mode in the recording section shown in FIGS. 1, 1(A) and 1(B) and a video signal which was recorded in the high-fineness recording mode in the same recording section. For the purpose of illustration, the following description is made with reference to the operation of reproducing a video signal which is recorded on the magnetic disc on the basis of the high-fineness recording mode.

Referring to FIGS. 5, 5(A) and 5(B), when initiation of a reproducing operation and a track number to be reproduced are specified through an operation part 276, a system controller 275 transmits a corresponding instruction to a head moving mechanism 285 to cause magnetic heads 201, 202, 203, and 204 to move to the recording track of a magnetic disc 286 which has been specified through the operation part 276.

In the meantime, when the instruction to initiate the reproducing operation is given through the operation part 276, a motor control circuit 282 is actuated in accordance with the instruction of the system controller 275 to control a motor 281 provided for rotating the magnetic disc 286 so that the motor 281 can run in a predetermined phase with respect to the vertical synchronizing signal V supplied from the system controller 275. More specifically, a PG detector 283 is arranged to detect the position of a PG pin (not shown) provided on the magnetic disc 286, and each time the PG detector 283 detects the passage of the PG pin, a PG pulse generator 284 generates a PG detection pulse. The PG detection pulse thus generated and the vertical synchronizing signal V generated by the system controller 275 are supplied to the motor control circuit 282, thereby controlling the motor 281 so that the PG detection pulse and the vertical synchronizing signal V bear a predetermined phase relationship. Thus, the magnetic disc 286 is rotated in synchronization with the vertical synchronizing signal V.

As described above, the magnetic heads 201, 202, 203, and 204 are moved to arbitrary contiguous recording tracks formed on the magnetic disc 286, and when the rotation of the magnetic disc 286 by the motor 281 becomes stable, the recorded signals are reproduced from the magnetic disc 286 through the magnetic heads 201, 202, 203 and 204. The signals reproduced by the magnetic heads 201, 202, 203, and 204 are amplified by corresponding transformers 205, 206, 207, and 208, and are further amplified by corresponding pre-amplifiers 209, 210, 211, and 212. The reproduced signals amplified by the pre-amplifiers 209 and 210 are supplied to a field change-over switch 213, while the reproduced signals amplified by the pre-amplifiers 211 and 212 are supplied to a field change-over switch 214.

The switching operations of the respective field change-over switches 213 and 214 are controlled by the system controller 275. The system controller 275 receives the PG detection pulse output from the PG pulse generator 284. In synchronization with the PG detection pulse, the system controller 275 switches each of the field change-over switches 213 and 214 between sides A and B in FIG. 5 so that the reproduced signals picked up by the magnetic heads 201 and 203 are first output at the same time and the reproduced signals picked up by the magnetic heads 202 and 204 are then output at the same time.

The signal output from the field change-over switch 213 is supplied to a high-pass filter (HPF) 215 and band-pass filters 231 and 271, while the signal output from the field change-over switch 214 is supplied to a high-pass filter (HPF) 221 and band-pass filters 241 and 272.

The high-pass filter 215 extracts a frequency-modulated luminance signal from the reproduced signal supplied from the field change-over switch 213. The high-pass filter 221 likewise extracts a frequency-modulated luminance signal from the reproduced signal supplied from the field change-over switch 214. The frequency-modulated luminance signals thus extracted are supplied to corresponding equalizer circuits 216 and 222, where the frequency characteristics of the respective signals are corrected. The outputs of the respective equalizer circuits 216 and 222 are supplied to corresponding limiter circuits 217 and 223, where they are respectively suppressed to predetermined levels for the purpose of prevention of inversion. Then, the outputs of the respective limiter circuits 217 and 223 are applied to corresponding frequency demodulation circuits 218 and 224 for the purpose of frequency-demodulation. The frequency-demodulated signals are applied to corresponding low-pass filters 219 and 225, where extra frequency components are eliminated from the respective signals. The outputs of the low-pass filters (LPF's) 219 and 225 are applied to corresponding deemphasis circuits 220 and 226, where the respective signals are subjected to a processing reverse to emphasis which was effected during recording. Thus, each of the low-pass filters (LPF's) 219 and 225 outputs a luminance signal which contains a synchronizing signal.

The band-pass filter (BPF) 231 extracts a frequency-modulated color-difference line sequential signal from the reproduced signal supplied from the field change-over switch 213. The band-pass filter (BPF) 241 likewise extracts a frequency-modulated color-difference line-sequential signal from the reproduced signal supplied from the field change-over switch 214. As in the case of the aforesaid luminance signal, the frequency-modulated color-difference line-sequential signal extracted by the band-pass filter (BPF) 231 is passed through an equalizer circuit 232, a limiter circuit 233, a frequency demodulation circuit 234, a low-pass filter (LPF) 235, and a deemphasis circuit 236 so that the signal is restored to the original color-difference line-sequential signal. The frequency-modulated color-difference line-sequential signal extracted by the band-pass filter (BPF) 241 likewise passes through an equalizer circuit 242, a limiter circuit 243, a frequency demodulation circuit 244, a low-pass filter (LPF) 245, and a deemphasis circuit 246 so that the signal is restored to the original color-difference line-sequential signal.

The luminance signal which contains the synchronizing signal and which has been output from the deemphasis circuit 220 is supplied to a synchronizing signal eliminating circuit 291 for the purpose of eliminating the synchronizing signal. The output of the synchronizing signal eliminating circuit 291 is applied to an analog/digital (A/D) converter 227 and a low-pass filter (LPF) 229 for the purpose of eliminating extra frequency components. The output of the low-pass filter (LPF) 229 is supplied to an adder 237. Similarly, the luminance signal which contains the synchronizing signal and which has been output from the deemphasis circuit 226 is supplied to a synchronizing signal eliminating circuit 292 for the purpose of eliminating the synchronizing signal. The output of the synchronizing signal eliminating circuit 292 is supplied to an analog/digital (A/D) converter 228 and a low-pass filter (LPF) 230 for the purpose of eliminating extra frequency components. The output of the low-pass filter (LPF) 230 is supplied to an adder 247. In the adder 237, the output of the low-pass filter (LPF) 229 is added to the color-difference line-sequential signal output from a deemphasis circuit 236, while in the adder 247, the output of the low-pass filter (LPF) 230 is added to the color-difference line-sequential signal output from a deemphasis circuit 246. Thus, the adders 237 and 247 sequentially supply R and B signals to A/D converters 238 and 248, respectively. It is to be noted that, in the aforesaid addition of the luminance signals to the color-difference line-sequential signals, the time axes of the luminance signal and the color-difference line-sequential signal are made coincident with each other by a delay circuit (not shown) so that each luminance signal can be added to a corresponding color-difference line-sequential signal.

The band-pass filters (BPF's) 271 and 272 extract the signals $13f_H$ from the reproduced signals supplied from the corresponding field change-over switches 213 and 214, and then supply the signals $13f_H$ to a writing clock signal generator 273. Moreover, the luminance signal which contains the synchronizing signal and which has been output from the deemphasis circuit 220 is applied to a synchronizing signal separating circuit 239, while the luminance signal which contains the synchronizing signal and which has been output from the deemphasis circuit 226 is applied to a synchronizing signal separating circuit 240. The synchronizing signals which have been obtained by separation in the respective synchronizing signal separating circuits 239 and 240 are supplied to the writing clock signal generator 273. The writing clock signal generator 273 employs these signals to form writing clock signals to be applied to the aforesaid A/D converters 227, 228, 238, and 248.

The following is a description of the operation of the writing clock signal generator 273.

During recording, the same signal $13f_H$ is recorded on the recording tracks on the magnetic disc 286 which are to be reproduced by the recording heads 201 and 203 or on the recording tracks on the magnetic disc 286 which are to be reproduced by the recording heads 202 and 204. However, the phase difference between the signals reproduced by the individual magnetic heads may occur during reproduction due to the discrepancy between the azimuths of the magnetic heads. If such a phase difference takes place, it follows that a phase difference occurs in the signal $13f_H$ obtained by separation in each of the band-pass filters (BPF's) 271 and 272. For this reason, a PLL (phase-locked loop) circuit disposed in the writing clock signal generator 273 is used to form a writing clock signal which is phase-synchronized with the signal $13f_H$ obtained by separation in the band-pass filter (BPF) 271 for the sake of the A/D converters 227 and 238. Also, for the sake of the A/D converters 228 and 248 another PLL circuit disposed in the writing clock signal generator 273 is used to form a writing clock signal which is phase-synchronized with the signal $13f_H$ obtained by separation in the band-pass filter (BPF) 272.

In order to form the writing clock signal in the writing clock signal generator 273 with an even higher precision, a video signal is recorded so that the rising position of the horizontal synchronizing signal of the video signal coincides with the position of the zero-crossing of the signal $13f_H$. During reproduction, in the writing clock signal generator 273, the signals $13f_H$ supplied from the respective band-pass filters (BPF's) 271 and 272 are phase-controlled so that the rising positions of the horizontal synchronizing signals which are separated by and supplied from the respective synchronizing signal separating circuits 239 and 240 are coincident with the zero-crossings of the signals $13f_H$ which are separated by and supplied from the respective band-pass filters 271 and 272. Subsequently, each PLL circuit in the writing clock signal generator 273 forms the writing clock signal as described above.

The writing clock signals thus formed are supplied to phase fine-adjusting circuits 277 and 278, respectively. The phase fine-adjusting circuits 277 and 278 enable the phases of the supplied writing clock signals to be finely adjusted by operating the operation part 276. The operator operates the operation part 276 while checking an image which is reproduced on a monitor (not shown) by the reproducing apparatus according to the above embodiment, to make fine adjustment of the phases of the writing clock signals through the respective phase fine-adjusting circuits 277 and 278, thereby optimizing the phases of the writing clock signals.

The writing clock signal output from the phase fine-adjusting circuit 277 is supplied to the A/D converters 227 and 238, while the writing clock signal output from the phase fine-adjusting circuit 278 is supplied to the A/D converters 228 and 248. On the basis of the supplied writing clock signals, the A/D converters 227 and 228 effect A/D conversion of the supplied luminance signals, and the A/D converters 238 and 248 effect A/D conversion of the supplied R and B signals, respectively. The digital luminance signals output from the respective A/D converters 227 and 228 are supplied to a memory 250, and the digital R and B signals output from the respective A/D converters 238 and 248 are supplied to a memory 251. Memory control circuits 252 and 254, which are set to their writing control states in accordance with the instruction of the system controller 275, are caused to operate on the basis of the writing clock signals output from the phase fine-adjusting circuits 277 and 278. Thus, the memory control circuits 252 and 254 specify particular write addresses in the memories 250 and 261, respectively, thereby allowing the supplied signals to be stored in the respective memories 250 and 251.

In this manner, the memory 250 stores the digital luminance signals for two frames which have been obtained from the signals reproduced from the four recording tracks on the magnetic disc 286, while the memory 251 stores the R and B signals for two frames. The system controller 275 counts the writing clock signals output from the respective phase fine-adjusting circuits 277 and 278, and if the system controller 275 detects the fact that the storage operations of the memories 250 and 251 have been completed, the system controller 275 sets the memory control circuits 252 and 254 to their readout control states and further instructs interpolation computing circuits 253 and 255 to start an interpolation processing.

The following is a description of the interpolation processing effected in the apparatus according to the above embodiment. In the right-hand view of FIG. 3(A), the marks "◯" represent the positions, on the picture, of picture elements which correspond to the digital luminance signal stored in the memory 250. In the right-hand view of FIG. 3(B), the marks "◯" represent the positions, on the picture, of picture elements which correspond to the digital R signal stored in the memory 251, and in the right-hand views of FIG. 3(C), the marks "◯" represent the positions, on the picture, of picture elements which correspond to the digital B signal stored in the memory 251.

In the above embodiment, the interpolation processing is effected in such a way that data placed at the positions indicated by the marks "." in FIGS. 3(A), 3(B) and 3(C) is interpolated by using the data, indicated by the marks "◯", located around the marks ".". A specific interpolation method for carrying out such an interpolation processing utilizes an interpolation filter which is constructed using the average value of the picture element data, denoted by "◯", which is located around each data ".". Interpolation computing circuits 253 and 255 instruct the corresponding memory control circuits 252 and 254 to read from the respective memories 250 and 251 the picture-element data required for the aforesaid interpolation method to write the readout data into the corresponding interpolation computing circuits 253 and 255. The memory control circuits 252 and 254 control the readout addresses of the corresponding memories 250 and 251 in accordance with the instructions of the respective interpolation computing circuits 253 and 255, thereby writing the required picture-element data into the interpolation computing circuits 253 and 255. Each of the interpolation computing circuits 253 and 255 employs the written picture element data to form interpolated picture element data corresponding to the data "." in FIGS. 3(A), 3(B), and 3(C). The interpolation computing circuits 253 and 255 supply the interpolated picture element data to the corresponding memories 250 and 251.

In the meantime, the memory control circuits 252 and 254 supply write addresses to the respective memories 250 and 251 in order to cause the memories 250 and 251 to store the supplied interpolated picture element data. Thus, the interpolated picture element data is stored at the specified addresses in the memories 250 and 251.

By effecting such an interpolation processing in the above-described manner, picture element data equivalent to approximately $1,200 \times 1,000$ picture elements per picture is retained in the memories 250 and 251.

Incidentally, when chrominance signals are compared with luminance signals, the chrominance signals are less than the luminance signals in respect of the amount of information recorded on the magnetic disc 286. Therefore, since the amount of interpolated picture element data formed by the interpolation processing are increased, it may be impossible to enhance the resolution of the chrominance signals. However, such impossibility is not a problem since no deterioration in the image quality conspicuously appears by virtue of the visual characteristics of human beings.

As described above, after the interpolation processing on the memories 250 and 251 has been completed, the system controller 275 instructs a reading clock signal generator 274 to supply reading clock signals to the memory control circuits 252 and 254. In synchronization with the supplied reading clock signal, the memory control circuit 252 reads the digital luminance signal retained in the memory 250 with the memory control circuit 254 reading the R and B signals retained in the memory 251. These readout signals are supplied to a signal forming circuit 256.

The signal forming circuit 256 consists of a matrix circuit, a synchronizing-signal adding circuit and so forth, and is arranged to form various forms of video signals by employing the supplied digital luminance signals and the supplied R and B signals and then to output the video signals after adding synchronizing signals thereto. In the above embodiment, the signal forming circuit 256 is provided with a digital output terminal 257 provided for outputting a digital video signal to a printer or a personal computer, a high-definition signal output terminal 259 provided for outputting an analog video signal which conforms to high-definition television standards, an RGB terminal 261 provided for outputting analog RGB signals, and an NTSC output terminal 263 provided for outputting an analog video signal which conforms to NTSC standards. The operator selects the desired output form of video signal through the operation part 276, and in response to the output form of the video signal selected by the operator, the system controller 275 gives an instruction signal to the signal forming circuit 256. In response to the instruction signal, the signal forming circuit 256 converts the supplied digital luminance signal, R signal, and G signal into the selected output form of the video signal and, at the same time, adds a synchronizing signal thereto, thereby outputting the obtained digital signal through the digital output terminal 257. If the video signal is to be output in an arbitrary analog form, the digital signal is converted into an analog signal through any of digital/analog (D/A) converters 258, 260 and 262 and then provided at the corresponding output 259, 261 or 263.

Figure 6A:
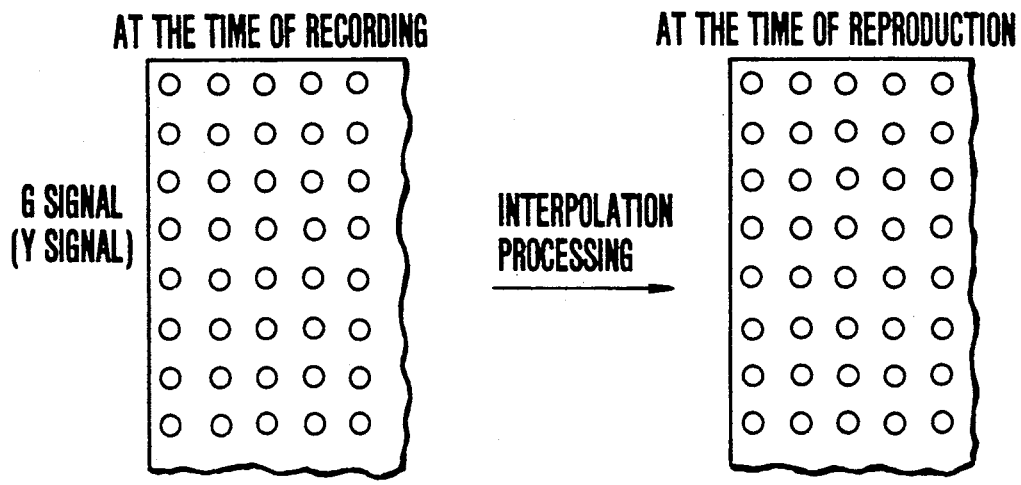
FIGS. 6(A), 6(B) and 6(C) are diagrammatic views each of which serves to illustrate the relationship between the arrangement of picture elements which correspond to a video signal recorded on a magnetic disc in a normal recording mode in the embodiment of the electronic still video camera system and the arrangement of picture elements which are interpolated during reproduction.
Figure 6B:
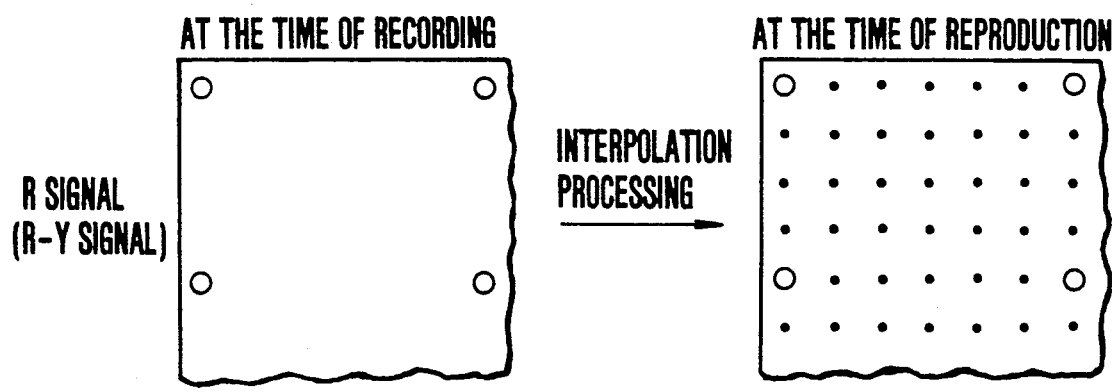
Figure 6C:
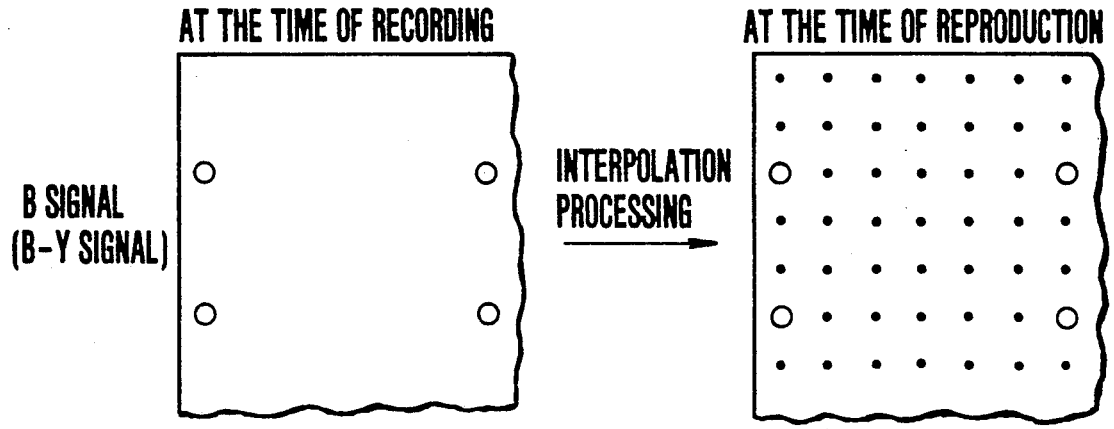

The foregoing is a description of the operation of the reproducing part of the electronic still video camera system shown in FIGS. 5, 5(A) and 5(B) in the case of reproducing the video signals which were recorded on the magnetic disc in the high-fineness recording mode by the recording part shown in FIGS. 1, 1(A) and 1(B). When video signals recorded on the magnetic disc in the normal recording mode by the aforesaid recording system is to be reproduced by the recording part, all that is required is to operate the circuits for effecting processing of the reproduced signals provided by the magnetic heads 201 and 202 shown in FIG. 5(A). This operation is substantially equivalent to the operation executed to reproduce the video signals recorded in the aforesaid high-fineness recording mode, and a detailed description is therefore omitted. Incidentally, as shown by the marks "○" in the left-hand view of each of the FIGS. 6(A), 6(B) and 6(C), the amount of picture-element information conveyed by a video signal recorded in the normal recording mode is less than the amount of picture-element information conveyed by a video signal recorded in the high-fineness recording mode. Also, the interpolation processing during reproduction is applied to the chrominance signal, and the interpolation computing circuit 255 is arranged to interpolate only the picture-element data present at the positions indicated by the marks "." in the right-hand view of each of FIGS. 6(B) and 6(C) by using data, denoted by the marks "○", which is located around each data ".". The signal forming circuit 256 is arranged so as not to form any analog signal that conforms to high-definition television standards, and no analog video signal is provided at the high-definition signal output terminal 259.

In order to effect switchings between the process of reproducing the video signals recorded in the normal recording mode and the process of reproducing the video signals recorded in the high-fineness recording mode, the operation part 276 may be operated to supply to the system controller 275 an instruction to execute a reproduction process corresponding to either of the two recording modes. However, instead of the above arrangement, a recording-mode identifying code may be set in the ID signal recorded together with the video signal during recording, and a circuit for identifying a recording mode may be provided in the reproducing part. In this arrangement, which of the recording modes was selected to record the reproduced signal may be automatically determined on the basis of the recording-mode identifying code contained in the ID signal added to the signal reproduced from the magnetic disc 286, and the result may be supplied to the system controller 275 for the purpose of selecting a corresponding reproduction process.

As described above, in the electronic still video camera according to the present embodiment, it is possible to record high-fineness video signals in a form which conforms to the format of electronic still video cameras and to reproduce the recorded high-fineness video signals. Moreover, it is possible to restore such high-fineness video signals without being influenced by a fluctuation in the time axis.

In the above-described embodiment, high-fineness video signals are formed by means of three solid-state image sensors, but the present invention is not limited solely to this arrangement. It is also possible to form equivalent high-fineness video signals by using one or two solid-state image sensors including a larger number of picture elements. For example, if it is desired to form high-fineness video signals by using one solid-state image sensor, a color filter having the construction shown in FIG. 7 may be employed.

It will be appreciated from the foregoing that, in accordance with the present invention, it is possible to provide an image signal recording apparatus having compatibility with a conventional format and yet being capable of recording on a recording medium an image signal which has higher quality and a wider band than an image signal recorded by a conventional apparatus but which does not contain substantial aliasing noise.

What is claimed is:

1. An image signal recording apparatus for recording an image signal on a recording medium, comprising:
    (A) first image signal outputting means for outputting a first image signal having a first frequency band;
    (B) second image signal outputting means for outputting a second image signal having a second frequency band and a signal component which differs from a signal component of said first image signal;
    (C) third image signal outputting means for sampling said second image signal output from said second image signal outputting means to form a third image signal having a third frequency band which is narrower than said first and second frequency bands and to output said third image signal;

(D) recording image signal forming means for forming a recording-image signal to be recorded on the recording medium by using said first image signal output from said first image signal outputting means and said third image signal output from said third image signal outputting means; and (E) recording means for recording on the recording medium said recording image signal formed by said recording image signal forming means.

2. An image signal recording apparatus according to claim 1, wherein said first image signal includes a luminance signal having said first frequency band.

3. An image signal recording apparatus according to claim 2, wherein said second image signal includes a color information signal having said second frequency band, and wherein said third image signal outputting means is arranged to sample a color information signal output from said second image signal outputting means, then to form a color information signal having said third frequency band which is narrower than said first and second frequency bands, and then to output said color information signal.

4. An image signal recording apparatus according to claim 3, wherein said recording image signal forming means includes:

(A) color-difference signal forming means for forming two kinds of color-difference signal by employing said luminance signal output from said first image signal outputting means and said color information signal output from said third image signal outputting means and then for outputting said two kinds of color-difference signal;

(B) color-difference line-sequential signal forming means for forming a color-difference line-sequential signal by employing said two kinds of color-difference signal formed by said color-difference signal forming means;

(C) first frequency modulating means for frequency-modulating said luminance signal output from said first image signal outputting means to form a frequency-modulated luminance signal;

(D) second frequency modulating means for frequency-modulating said color-difference line-sequential signal output from said color-difference line-sequential signal forming means to form a frequency-modulated color-difference line-sequential signal; and (E) frequency multiplexing means for forming a recording image signal by frequency-multiplexing said frequency-modulated luminance signal formed by said first frequency modulating means and said frequency-modulated color difference line-sequential signal formed by said second frequency modulating means.

5. An image signal recording apparatus for recording on a recording medium an image signal obtained by imaging an object, comprising:

(A) first image sensing means for imaging the object to generate a first image signal having a first frequency band;

(B) second image sensing means for imaging the object to generate a second image signal having a frequency band equal to said first frequency band of said first image signal and having a signal component which is the same in kind as a signal component of said first image signal, the arrangement of picture elements of said second image sensing means differing from the arrangement of picture elements of said first image sensing means in relation to the object;

(C) third image sensing means for imaging the object to generate a third image signal having a second frequency band and a signal component which differs in kind from a signal component of one of said first image signal and said second image signal;

(D) fourth image signal forming means for sampling said third image signal generated by said third image sensing means to form a fourth image signal having a third frequency band which is narrower than said first and second frequency bands;

(E) recording image signal forming means for forming a first recording image signal for one frame by using said first image signal output from said first image sensing means and said fourth image signal output from said fourth image signal forming means and for forming a second recording image signal for one frame by using said second image signal output from said second image sensing means and said fourth image signal output from said fourth image signal forming means; and (F) recording means for recording said first recording image signal for one frame and said second recording image signal for one frame which have been formed by said recording image signal forming means, in different regions on the recording medium, respectively.

6. An image signal recording apparatus according to claim 5, wherein said first image sensing means includes a first image sensor having a first number of picture elements and being arranged to generate said first image signal.

7. An image signal recording apparatus according to claim 6, wherein said second image sensing means includes a second image sensor whose picture elements are equal in number to the picture elements of said first image sensor and whose imaging plane is located at a position deviating from the position of an imaging plane of said first image sensor in the horizontal and vertical directions in relation to the object, said second image sensor being arranged to generate said second image signal.

8. An image signal recording apparatus according to claim 5, wherein said first image sensing means includes a green filter capable of transmitting a green component of an image of the object, said first image signal being an image signal corresponding to said green component of the image of the object.

9. An image signal recording apparatus according to claim 8, wherein said second image sensing means includes a green filter capable of transmitting a green component of the image of the object, said second image signal being an image signal corresponding to said green component of the image of the object.

10. An image signal recording apparatus according to claim 9, wherein said third image sensing means includes a color separating filter capable of transmitting a blue component and a red component of the image of the object, said third image signal being an image signal corresponding to said red component and said blue component of the image of the object.

11. An image signal recording apparatus according to claim 5, wherein said first recording image signal for one frame formed by said recording image signal forming means is composed of said first recording image signal for two fields, and wherein said second recording image signal for one frame formed by said recording image signal forming means is composed of said second recording image signal for two fields.

12. An image signal recording apparatus according to claim 11, wherein said recording means is arranged to record said first recording image signal for one frame formed by said recording image signal forming means in two tracks on the recording medium at intervals of one field, and to record said second recording image signal for one frame formed by said recording image signal forming means in other two tracks on the recording medium at intervals of one field.

13. An image signal recording apparatus for recording an image signal on a recording medium, comprising:
   (A) first image signal outputting means for outputting a first image signal having a first frequency band;
   (B) second image signal outputting means for outputting a second image signal having a second frequency band and a signal component which differs from a signal component of said first image signal;
   (C) third image signal outputting means for sampling said second image signal output from said second image signal outputting means to form a third image signal having a third frequency band which is narrower than said first and second frequency bands and to output said third image signal;
   (D) recording image signal forming means for forming a recording-image signal to be recorded on the recording medium by frequency-multiplexing said first image signal output from said first image signal outputting means and said third image signal output from said third image signal outputting means; and
   (E) recording means for recording on the recording medium said recording image signal formed by said recording image signal forming means.

14. An image signal recording apparatus according to claim 13, wherein said first image signal includes a luminance signal having said first frequency band.

15. An image signal recording apparatus according to claim 14, wherein said second image signal includes a color information signal having said second frequency band, and wherein said third image signal outputting means is arranged to sample a color information signal output from said second image signal outputting means, then to form a color information signal having said third frequency band which is narrower than said first and second frequency bands, and then to output said color information signal.

16. An image signal recording apparatus according to claim 15, wherein said recording image signal forming means includes:
   (A) color-difference signal forming means for forming two kinds of color-difference signal by employing said luminance signal output from said first image signal outputting means and said color information signal output from said third image signal outputting means and then for outputting said two kinds of color-difference signal;
   (B) color-difference line-sequential signal forming means for forming a color-difference line-sequential signal by employing said two kinds of color-difference signal formed by said color-difference signal forming means;
   (C) first frequency modulating means for frequency-modulating said luminance signal output from said first image signal outputting means to form a frequency-modulated luminance signal;
   (D) second frequency modulating means for frequency-modulating said color-difference line-sequential signal output from said color-difference line-sequential signal forming means to form a frequency-modulated color-difference line-sequential signal; and
   (E) frequency multiplexing means for forming a recording image signal by frequency-multiplexing said frequency-modulated luminance signal formed by said first frequency modulating means and said frequency-modulated color-difference line-sequential signal formed by said second frequency modulating means.

17. An image signal recording apparatus for recording on a recording medium an image signal obtained by imaging an object, comprising:
   (A) An image sensing part, including:
      (1) image sensing means for imaging the object to generate a first image signal having a first frequency band and a second image signal having a second frequency band different from said first frequency band and a signal component which is different from a signal component of said first image signal; and
      (2) third image signal outputting means for sampling said second image signal generated by said image sensing means to form a third image signal having a third frequency band which is narrower than said first and second frequency bands and to output said third image signal; and
   (B) a recording part provided integrally with said image sensing part, including:
      (1) recording image signal forming means for forming a recording-image signal to be recorded on the recording medium by using said first image signal output from said image sensing means and said third image signal output from said third image signal forming means; and
      (2) recording means for recording on the recording medium said recording image signal formed by said recording image signal forming means.

18. An image signal recording apparatus according to claim 17, wherein said image sensing means includes;
   (a) a first image sensor for imaging the object to generate a first image signal having a first frequency band; and
   (b) a second image senser for imaging the object to generate a second image signal having a second frequency band and a signal component which differs from a signal component of said first image signal.

19. An image signal recording apparatus according to claim 18, wherein said recording image signal forming means is arranged to form a recording image signal to be recorded on the recording medium by frequency-multiplexing said first image signal output from said image sensing means and said third image signal output from said third image signal forming means.

20. An image signal recording apparatus according to claim 18, wherein said first image sensor includes a green filter capable of transmitting a green component of an image of the object, said first image signal being an image signal corresponding to said green component of the image of the object.

21. An image signal recording apparatus according to claim 20, wherein said second image sensor includes a color separating filter capable of transmitting a blue component and a red component of the image of the object, said second image signal being an image signal corresponding to said red component and said blue component of the image of the object.

* * * * *